United States Patent Office 3,555,143
Patented Jan. 12, 1971

3,555,143
METHOD FOR THE DETERMINATION OF PROTEINS AND POLYPEPTIDES
Rolf E. A. V. Axen, Upplands Balinge, and Jerker O. Porath and Leif Edvin Wide, Uppsala, Sweden, assignors to Pharmacia AB, Uppsala, Sweden, a company of Sweden
Filed June 2, 1967, Ser. No. 643,190
Claims priority, application Sweden, June 2, 1966, 7,541/66
Int. Cl. A61k 27/04
U.S. Cl. 424—1
3 Claims

ABSTRACT OF THE DISCLOSURE

A process comprising contacting particles of water insoluble polymers to which have been bound antibodies, by means of covalent bonds, against the protein or polypeptide to be determined, wherein a certain quantity of the protein or polypeptide is labeled with a radioactive isotope, whereupon the particles, subsequent to the reaction between the protein or the polypeptide and the antibodies attached to the particles are separated from the sample liquid and the radioactivity of the particle material and/or in the liquid is determined.

---

Figure 1:
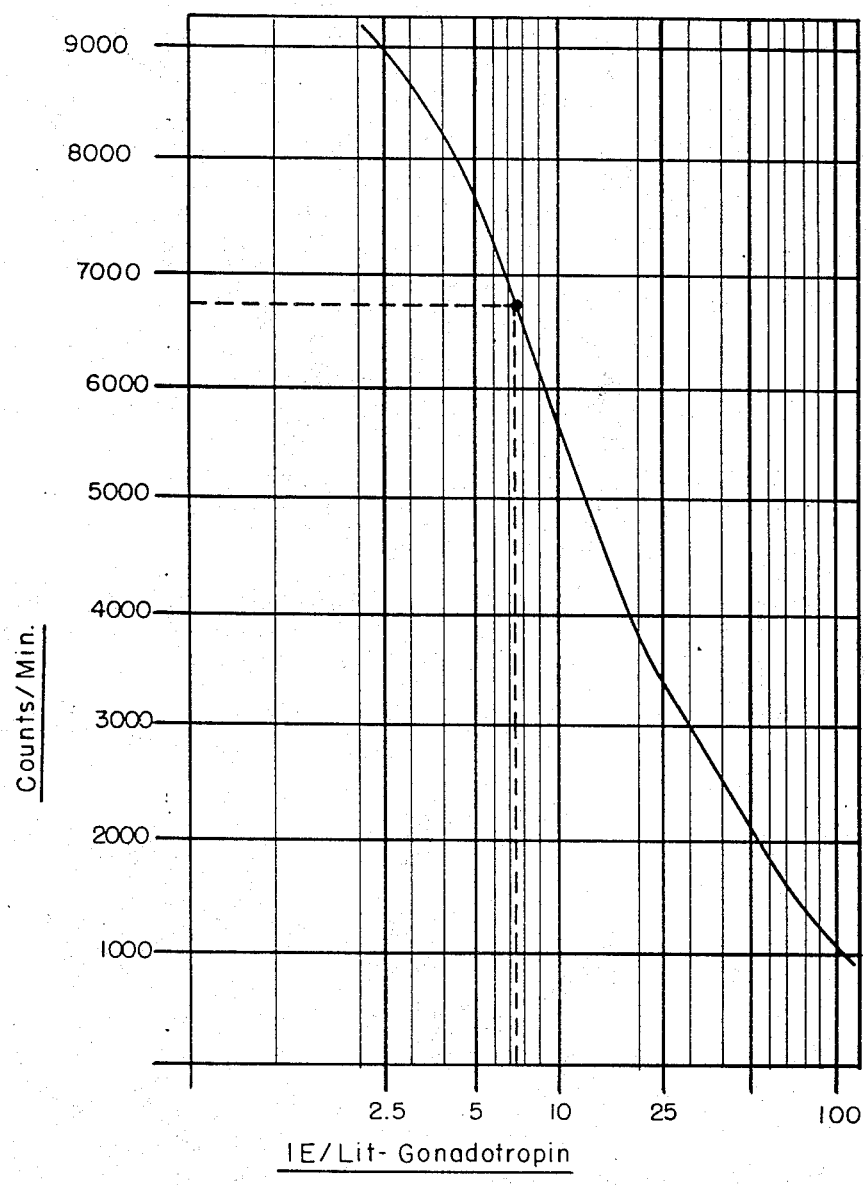

The present invention relates to a method for the determination of proteins and polypeptides, for instance protein and polypeptide, hormones, in aqueous samples, e.g. from body fluids such as blood serum or urine, but also from other sources such as different types of gland extracts. An essential factor of the method is that the substance to be determined is capable of acting as an antigen, i.e. is capable of causing the formation of antibodies against itself in animals.

The invention is characterized in that particles of water insoluble polymers to which have been bound antibodies, by means of covalent bonds, against the protein or polypeptide to be determined, are contacted with the sample and with a certain quantity of the protein or polypeptide labeled with a radioactive isotope, whereupon the particles, subsequent to the reaction between the protein or the polypeptide and the antibodies attached to the particles having taken place, are separated from the sample liquid and the radioactivity of the particle material and/or in the liquid is determined.

The method can be used for qualitative and quantitative determination.

The invention is based partly upon the knowledge that under certain circumstances proteins and polypeptides are generally able to act as antigens, i.e. able to cause the formation of antibodies, and partly on the fact that radioimmunological methods are very sensitive and well suited for determining different proteins and polypeptides, present in a very low concentration in body fluids.

Radioimmunological methods are in general based on the ability of an antibody to bind its protein antigen irrespective of whether the latter is labeled with a radioactive isotope, or not. The binding of labeled and unlabeled protein antigens takes place in proportion to the concentration of labeled and unlabeled, respectively, proteins. The radioactivity of the labeled protein which is bound to the antibodies, and/or of the free, labeled protein in the sample liquid is measured. The amount of unlabeled competing protein can be determined from the obtained values by calculation or by direct comparison with a standard curve.

In principle, radioimmunological methods can be applied to proteins and polypeptides which are antigenic, capable of being purified and labeled with a radioactive isotope. The antibody bound protein has to be separated from the unbound protein. This separation process has previously been effected by a large number of different methods, such as paper chromatography, electrophoresis, precipitation with a salt or ethyl alcohol, precipitation of antibodies by antibodies against the latter or gel filtration. These methods are complicated, time consuming, unpractical and unreliable for use in routine tests, e.g. in an ordinary hospital laboratory.

The great advantage of the present method is that the antibodies are firmly attached to an insoluble carrier and that the labeled protein, which reacts with and is bound to the antibodies in the determination, can thus be easily separated from the unbound labeled protein, e.g. by simple centrifugation, or filtration, the separation being insensitive to variations in the salt and protein concentrations of the liquid within physiological limits. The test is easy to perform as known amounts of particles together with antibodies attached thereto, can be predispensed in test tubes, for instance, and stored without loosing the binding ability. The whole procedure, including the separation of the free labeled proteins and antibody bound labeled proteins, can be made in one and the same test tube without any further addition of precipitants or the like.

The method requires access to the protein or the polypeptide to be determined for producing antibodies and for preparing radioactive labeled proteins or polypeptides, and suitably also for obtaining standard solutions, for instance, for obtaining standard curves.

Examples of proteins and polypeptides against which antibodies can be obtained are plasma proteins, enzymes and many hormones. Examples of such hormones are insulin, gonadotropins, growth hormone. ACTH, thyrotropin and parathormone.

The antibodies against the protein or the polypeptide can be prepared by any method known per se, by immunising animals used for experiments, by, for instance, repeated subcutaneous injections of small amounts of the antigenic protein or polypeptide possible combined with a so-called adjuvant such as Freund's mineral oil emulsion, into the animal. The antibodies produced in the animals can be recovered from the blood serum of the same. The protein fraction, which contains the antiserum, can be recovered by conventional methods, e.g. by precipitating the serum with suitable amounts of a saturated aqueous solution of ammonium sulphate.

Labeling of the protein or polypeptide with a radioactive isotope can be effected in a conventional manner, a suitable isotope for the purpose being selected, e.g. $I^{125}$, $I^{131}$, $C^{14}$ or $H^3$. A particularly suitable isotope is a radioactive isotope of iodine such as $I^{125}$, as labeling with this isotope is simple and as, for instance, many hospital laboratories now have the equipment necessary to measure this isotope.

Particles of water insoluble polymers are used as carriers for the antibodies. The polymer is selected so that it contains, or can be provided with, suitable reactive groups such as amino groups, hydroxyl groups and carboxylic groups, to readily make possible the binding of the antibodies to the polymer by bridges with covalent linkages.

Particularly suitable is the choice of polymer particles consisting of a three dimensional network, held together by covalent linkages. Such particles even though they are swellable in water, are completely insoluble therein and are thus unable to release any of the polymer material or of the substance bound thereto by covalent linkages, e.g. during washing procedures. Examples of such polymer particles are grains of copolymers obtained by cross linking substances containing a plurality of hydroxyl groups, such as carbohydrates and sugar alcohols, such as dextran, starch, dextrins and other polysaccharides, and polyvinyl alcohol with a bi-functional substance, e.g. bi-functional substances of the type X—R—Z, wherein, for instance, X and Z are each halogen or an epoxy group and R is the residue of the bi-functional substance, e.g. an aliphatic radical containing from 3 to 10 inclusive carbon atoms.

Grains of the commercially accessible product Sephadex which is dextran cross-linked with glycerine ether-bridges, obtained by treating dextran with epichlorohydrin, for instance, can be used for the purpose. Sephadex and products obtained in a similar manner are gel grains capable of swelling in water, but insoluble therein. They contain hydroxyl groups and can thus easily be substituted with other groups, e.g. groups containing amino groups or carboxyl groups, and are thus well suited for forming bridges by covalent bonds to the antibodies.

Suitably, small particles are chosen so that a wide contact area is obtained.

The antibodies are bound to the said carrier particles with covalent bonds under mild conditions so that the immuno-chemical reactivity of the antibodies does not substantially decrease. Because of the covalent binding the antibodies cannot loosen and become washed away from the particles. Reactive groups, such as amino groups, hydroxyl groups, and carboxyl groups, are used for chemically binding the antibody protein with the polymer particle, a bridge having covalent bonds being established between the antibody protein and the polymer particle, e.g. of the type:

Antibody—NH.CS.NH.Polymer particle
Antibody—NH.CO.NH.Polymer particle
Antibody—N=N— Polymer particle.

Further, in the analysis a solution of the protein or polypeptide of known concentration is suitably used as a standard.

The radioactivity determinations can be effected by common methods, e.g. by means of scintillation detectors.

The quantity of particles with antibodies is selected, among other things, with thought to the sensitivity level required in the test.

The amount of labeled protein or polypeptide, e.g. $I^{125}$ hormone, added in the reaction is chosen so that, for instance, approximately 40–60% of the labeled hormone can be bound to the antibodies when no competing unlabeled hormone is present. The incubation is preferably made at temperatures between +4 and 37° C. and usually at room temperature. It is not necessary for the reaction between the antigen and the antibodies to go to completion. The reaction is interrupted after, for instance, 24 hours, but may also be stopped earlier, for instance, after 2–4 hours. It is important that the reaction time and temperature are the same for the sample solutions and standard solutions.

Because the method is simple, rapid and practical, and gives accurate analysis results it is well suited for quantitative determinations, also for routine usage and permits determination of even very small amounts of sample substances.

The invention will be more closely illustrated in the following with reference to detailed examples and the annexed drawings.

Figure 2:
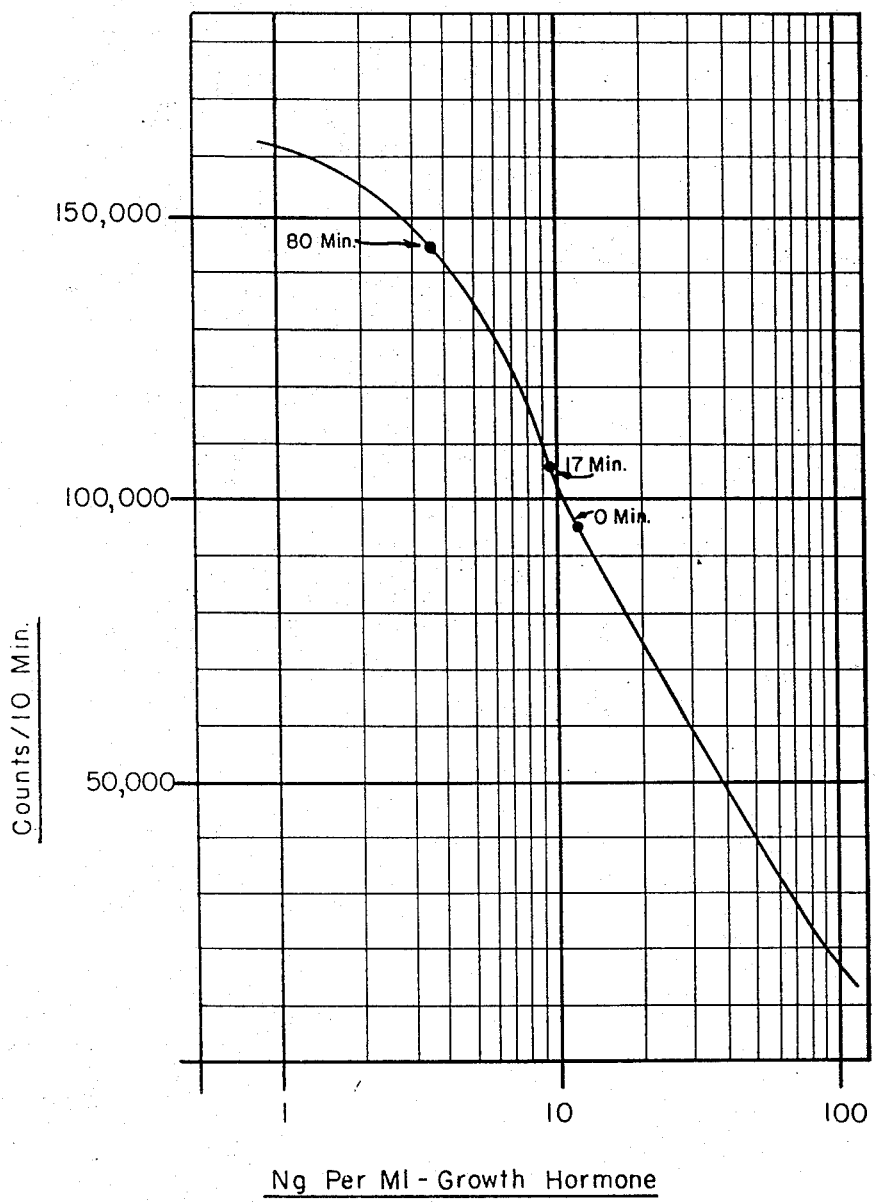
Figure 3:
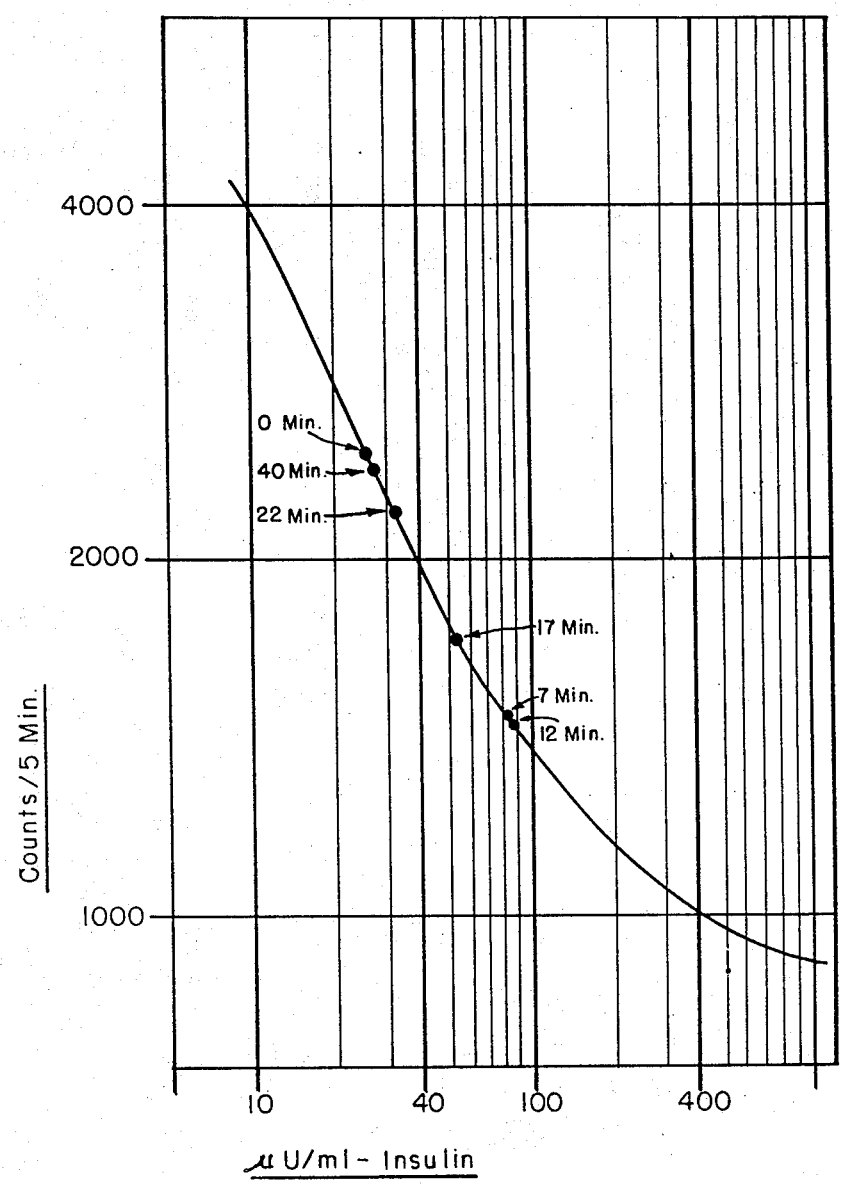

In the annexed drawings,

FIG. 1 is a curve showing counts per minute plotted as a function of the concentration of gonadotropin (in international units) in a series of standard solutions, said count being obtained according to Example 1 and said curve being possible to use for the determination of gonadotropin in unknown samples as indicated by the dashed lines;

FIG. 2 is a curve showing counts per 10 minutes plotted as a function of the concentration of growth hormone (in nanograms per ml.) in a series of standard solutions, said counts being obtained according to Example 2 and said curve being illustrated as used for the determination of growth hormone in unknown samples obtained from a patient after glucose loading at 0 min.; at 0 plus 17 min.; and at 0 plus 80 min., respectively, and FIG. 3 is a curve showing counts per 5 minutes plotted as a function of the concentration of insulin in micro units, $\mu u$, in a series of standard solutions per ml., said counts being obtained according to Example 3 and said curve being illustrated as used for the determination of insulin in unknown samples obtained from a patient after glucose loading at 0 min.; at 0+7 min.; at 0+12 min.; at 0+17 min.; at 0+22 min.; and at 0+40 min. respectively.

EXAMPLE 1

Determination of gonadotropin in urine (A) Preparation of antibodies: Rabbits were injected subcutaneously with 0.5 mg. of human gonadotropin in 2 ml. of Freund's adjuvant. Immunization was repeated every week for four weeks. Subsequent to the passing of a further week, blood was drawn off from the rabbits and antiserum recovered from the blood by allowing the same to coagulate, and removing the clots of blood.

The antibody fraction was precipitated from this antiserum by treatment with a saturated aqueous solution of ammonium sulphate, 2.5 ml. of the saturated solution being added to 5 ml. of serum.

The precipitate was separated by centrifugation. The precipitate was dissolved in water and the precipitating process with ammonium sulphate solution was repeated twice. Subsequent to the third precipitating process the precipitate was dissolved in 0.1 ml. of an aqueous solution of sodium hydrogen carbonate after which dialysis took place against 0.1 M sodium hydrogen carbonate solution. This antibody fraction was used for the coupling.

(B) Preparation of particles with covalently bound antibodies: Finely grained particles of the product Sephadex (G 25, superfine) were used as a starting material, the product being dextran cross-linked with glycerine etherbridges and substituted with p-nitrophenoxy-hydroxypropyl-ether groups to a substitution degree of 200 $\mu$mol nitro groups per gram of dry substance. (The product had been obtained by reacting Sephadex G 25, superfine, with 2,3-epoxy-1-(4-nitrophenoxy)-propane in alkaline milieu.) 10 grams of the substituted Sephadex product were introduced together with 50 ml. of water, into a two-necked flask, after which the temperature of the mixture was maintained at 35° C. The mixture was agitated and at the same time there were supplied 25 ml. of a 5 N aqueous solution of sodium hydroxide and 6 grams of sodium dithionite for reducing the nitro groups into amino groups. After approximately 30 minutes a further 5 grams of sodium dithionite were added. The reduction process was interrupted after approximately 1 hour whereupon neutralization took place with diluted hydrochloric acid, the solid substance being removed by filtering and washed with distilled water on a suction filter.

10 grams of the above obtained Sephadex product substituted with p-amino-phenoxy - hydroxy - propyl groups were introduced into a reaction flask together with 100 ml. of a 10 percent solution of thiophosgene in carbon tetrachloride. The flask was sealed with a plug and the mixture agitated for approximately 2 hours. The obtained mixture was cooled in an ice bath whereupon the flask was opened and the contents filtered. The residue of filtration was washed with a 0.1 mol aqueous solution of sodium hydrogen carbonate, distilled water and acetone. The residue was then dried in a drying oven at 60–80° C. The Sephadex product, obtained according to the above, substituted with p-isothiocyanato-phenoxy-hydroxypropyl groups was swollen in 30 ml. of a 0.1 M aqueous solution of sodium hydrogen carbonate. The agitator was connected, whereupon 5 ml. of the dialysed antibody solution according to (A) was added in a drop-wise manner. The mixture was agitated for 24 hours at 20° C. whereupon it was filtered. The filter residue was washed with 0.5 M sodium hydrogen carbonate solution to remove the unbound substances. The product can be dried carefully, e.g. by lyophilization.

(C) Preparation of labeled gonadotropin: Human gonadotropin was labeled with $I^{125}$ according to the following method: 2 mc. $I^{125}$ in the form of NaI was oxidized with Chloramine T in the presence of 5 μg. of gonadotropin in accordance with a method described by Hunter and Greenwood (ref. Nature/London/, volume 194/1962/, page 495). Subsequent to the labeling, sodium dithionite was added to convert the remaining amount of iodine to soluble iodide. The obtained gonadotropin labeled with $I^{125}$ was separated from low molecular weight products by gel filtration on a copolymer of dextran with epichlorohydrin (Sephadex G–50). The gonadotropin labeled in this way has a specific activity of 200–300 mc. per mg. 1 ml. of the labeled protein fraction was collected in a small vessel containing ½ ml. of a solution of bovine plasma-albumin containing 50 mg. per ml. The labeled hormone was stored in cold surroundings and diluted before being used.

(D) Determination: The analyses are suitably effected in glass or plastic tubes 50 x 10 mm. in size.

(1) 1 ml. of a suspension of polymer particles (e.g. 1 mg./ml.) to which the antibodies have been bound was introduced into each of eight tubes designated, respectively. A, B, C, D, E, F, G and H.

(2) 0.25 ml. of the urine sample to be tested was added to one of the tubes (tube A).

(3) 0.25 ml. of standard solutions containing 100, 50, 25, 10, 5, 2.5 and 0 IE per liter was added to, respectively, tubes B, C, D, E, F, G and H.

(4) Incubation took place for 20 hours at room temperature, the tubes being slowly rotated during the incubation period.

(5) 0.1 ml. of the solution containing $I^{125}$-gonadotropin (approximately 1 nanogram per ml.) was added to each of the tubes A–H.

The abbreviation "IE" means "international units" (E=German Einheiten). In this connection, reference is made to World Health Organization Technical Report Series No. 293 WHO Expert Committee on Biological Standardization 17 e report Geneve 1964, page 12.

(6) Incubation as in item (4) but only for four hours.

(7) The particles were centrifuged down at 3000 revolutions per min. for 5 minutes.

(8) The particles were washed twice with a 0.9 percent aqueous solution of sodium chloride. After the last removal by suction of the supernatant the tubes were placed in counter tubes for estimating gamma radiation from the antibody bound labeled hormone.

(9) The number of "counts" for a certain time for standard tubes were entered on a counts-dose diagram on a lin-log scale, from which the amount of gonadotropin in the unknown test samples could then be calculated. (See separate FIG. 1.)

Alternatively subsequent to the centrifuging in item (7) 1 ml. of transferred supernatant can be transferred into counter tubes, whereupon the gamma radiation from the free labeled hormone can be estimated. "Counts" from these standard tubes can, in the same way, be entered into a count-dose diagram in lin-log scale and the amount of gonadotropin in the unknown test samples can then be estimated graphically from the connecting points in the same way as above.

EXAMPLE 2

Determination of growth hormone in blood plasma (A) Preparation of antibodies: Guinea pigs were injected subcutaneously with 0.5 mg. of human growth hormone in 2 ml. of Freund's adjuvant. Immunization was repeated every week for four weeks. Subsequent to the passing of a further week, blood was drawn off from the guinea pigs and antiserum recovered from the blood by allowing the same to coagulate, and removing the clots of blood.

The antibody fraction was precipitated from this antiserum by treatment with an aqueous solution of saturated ammonium sulphate, 2.5 ml. of the latter being added to 5 ml. of serum.

The precipitate was separated by centrifugation. The precipitate was dissolved in water and the precipitating process with ammonium sulphate solution was repeated twice. Subsequent to the third precipitating process the precipitate was dissolved in 0.1 ml. of an aqueous solution of sodium hydrogen carbonate after which dialysis took place against 0.1 M sodium hydrogen carbonate solution. This antibody fraction was used for the coupling.

(B) Preparation of particles with covalently bound antibodies: The preparation takes place in the same manner as under Example 1(B).

(C) Preparation of labeled growth hormone: Human growth hormone was labeled with $I^{125}$ according to the following method: 2 mc. $I^{125}$ in the form of NaI was oxidized with Chloramine T in the presence of 5 μg. of growth hormone in accordance with a method described by Hunter and Greenwood (ref. Nature/London/, volume 194/1962/, page 495). Subsequent to the labeling, sodium dithionite was added to convert the remaining amount of iodine to soluble iodide. The obtained growth hormone labeled with $I^{125}$ was separated from low molecular weight products by gel filtration on a copolymer dextran with epichlorohydrin (Sephadex G–50). The growth hormone labeled in this way has a specific activity of 200–300 mc. per mg. 1 ml. of the labeled protein fraction was collected in a small vessel containing ½ ml. of a solution of bovine plasma-albumin containing 50 mg. per ml. The labeled hormone was stored in cold surroundings and diluted before being used.

(D) Determination: The analyses are suitably effected in glass or plastic tubes 50 x 10 mm.

(1) 1 ml. of a suspension of polymer particles (e.g. 1 mg./ml.) to which the antibodies have been bound was introduced into each of all tubes.

(2) 0.1 ml. of the plasma to be tested was added to one tube.

(3) 0.1 ml. of standard solution having different concentration of the hormone, e.g. 20, 10, 5, 2, 1, 0.5 and 0.2 nanogram per ml. and 0 nanogram per ml. were each added to 1 tube.

(4) Incubation took place for 20 hours at room temperature, the tubes being slowly rotated during the incubation period.

(5) 0.1 ml. of the solution containing $I^{125}$-growth hormone (approx. 2 nanogram per ml.) was each added to all tubes.

(6) Incubation as in item (4) but only for four hours.

(7) The particles were centrifuged down at 4000 revolutions per min. for 1 min.

(8) The particules were washed twice with a 0.9 percent aqueous solution of sodium chloride. After the last removal by suction of the supernatant the tubes were placed in counter tubes for estimating the gamma radiation from the antibody bound labeled hormone.

(9) The number of "counts" for a certain time for standard tubes were entered on a counts-dose diagram on a lin-log scale, from which the amount of growth hormone in the unknown test samples could then be calculated. (See separate FIG. 2.)

Alternatively subsequent to the centrifuging in item (7) 1 ml. of supernatant can be transferred into counter tubes, whereupon the gamma radiation from the free, labeled hormone can be estimated. "Counts" from these standard tubes can, in the same way, be entered into a count-dose diagram in lin-log scale and the amount of the growth hormone in the unknown test samples can then be estimated graphically from the connecting points in the same way as above.

EXAMPLE 3

Determination of insulin in blood plasma (A) Preparation of antibodies: Guinea pigs were each injected subcutaneously with 0.5 mg. of pig insulin in 2 ml. of Freund's adjuvant. Immunization was repeated every week for four weeks. Subsequent to the passing of a further week, blood was drawn off from the guinea pigs and anti-serum recovered from the blood by allowing the same to coagulate, and removing the clots of blood.

The antibody fraction was precipitated from this antiserum by treatment with a saturated aqueous solution of ammonium sulphate solution, 2.5 ml. of the latter being added to 5 ml. of serum.

The precipitate was separated by centrifugation. The precipitate was dissolved in water and the precipitating process with ammonium sulphate solution was repeated twice. Subsequent to the third precipitating process the precipitate was dissolved in 0.1 ml. of an aqueous solution of sodium hydrogen carbonate, after which dialysis took place against 0.1 M sodium hydrogen carbonate solution. This antibody fraction was used for the coupling.

(B) Preparation of particles of covalent bound antibodies: This preparation took place in the same manner as under Example 1(B).

(C) Preparation of labeled insulin: Pig insulin was labeled with $I^{125}$ according to the following method: 2 mc. $I^{125}$ in the form of NaI was oxidized with Chloramine T in the presence of 5 μg. of insulin in accordance with a method described by Hunter and Greenwood (ref. Nature/London/, volume 194/1962/, page 495). Subsequent to the labeling, sodium dithionite was added to convert the remaining amount of iodine to soluble iodide. The obtained insulin labeled with $I^{125}$ was mixed with bovine plasma-albumin and separated from low molecular weight products and from denaturation products of insulin bound to the plasma-albumin by gel filtration on a copolymer dextran with epichlorohydrin (Sephadex G–50). The insulin labeled in this way has a specific activity of 100–200 mc. per mg. The second peak of the labeled protein fraction was collected in a small vessel containing ½ ml. of a solution of bovine plasma-albumin containing 50 mg. per ml. The labeled hormone was stored in cold surroundings and diluted before being used.

(D) Determination: The analyses are suitably effected in glass or plastic tubes 50 x 10 mm.

(1) 1 ml. of a suspension of polymer particles (e.g. 1 mg./ml.) to which the antibodies have been bound was introduced into each of all tubes.

(2) 0.1 ml. of the plasma to be tested was added to one tube.

(3) 0.1 ml. of a standard solution having different concentration of the hormone, e.g. 200, 100, 50, 25, 10, 5 and 2.5 μE/ml. and 0 μE/ml. were each added to 1 tube.

(4) 0.1 ml. of a solution containing $I^{125}$-insulin (approx. 1 nanogram per ml.) was added to all tubes.

(5) Incubation took place for 20 hours at room temperature or +4° C., the tubes being slowly rotated during the incubation period.

(6) The particles were centrifuged down at 4000 revolutions per min. for 1 minute.

(7) The particles were washed twice with a 0.9 percent aqueous solution of sodium chloride. After the last removal by suction of the supernatant the tubes were placed in counter tubes for estimating the gamma radiation from the antibody bound labeled hormone.

(8) The number of "counts" for a certain time for standard tubes were entered on a counts-dose diagram on a lin-log scale, from which the amount of insulin in the unknown test samples could then be calculated. See separate FIG. 3.

Alternatively subsequent to the centrifuging in item (7) 1 ml. of supernatant can be transferred into counter tubes, whereupon the gamma radiation from the free, labeled hormone can be estimated. "Counts" from these standard tubes can, in the same way, be entered into a count-dose diagram in lin-log scale and the amount of insulin in the unknown test samples can then be estimated graphically from the connecting points in the same way as above.

What we claim is:

1. A method for the determination of a member selected from the group consisting of proteins and polypeptides in aqueous samples, which comprises contacting particles of water insoluble polymers to which have been bound, by covalent bonds, antibodies against the said member to be determined, with the aqueous sample containing said member and with the same member labelled with a radioactive isotope to bind part of said labelled member and unlabelled member to said antibodies to produce a two-phase system comprising a solid phase comprising said bound part of labelled member and unlabelled member and a liquid phase comprising unbound labelled member and unlabelled member, separating the two phases from each other, and measuring the radioactivity of at least one of the said solid and said liquid phases, the value of said radioactivity being each a function of the concentration of the said member in the aqueous sample.

2. A method as claimed in claim 1, wherein the solid phase is washed with an aqueous liquid before measuring the radioactivity of said phase.

3. A method as claimed 1, wherein the determination is effected quantitatively by comparing the measured value of the radioactivity with a standard curve.

References Cited

UNITED STATES PATENTS

| 2,911,338 | 11/1959 | Tabern et al. | 167—51 |
| 2,770,602 | 11/1956 | Weichelbaum | 23—230 |

FOREIGN PATENTS

| 938,828 | 10/1963 | Great Britain | 167—51 |

OTHER REFERENCES

Munoz, John J., Some Newer Immunological Techniques, Analytical Chemistry, vol. 31, No. 6, pp. 981–85, June 1959.

Pressman et al., Computer Programs for Paired and Triad Radioiodine Label Techniques, Chem. Abstracts, vol. 64, p. 5606G, 1966.

Bennington, Radioautographic Analysis of Soluble Antibody-Antigen Complexes, Chem. Abstracts, vol. 54, p. 17521A.

LELAND A. SEBASTIAN, Primary Examiner

U.S. Cl. X.R.

252—301.1; 424—12